Patented July 12, 1932

1,866,971

UNITED STATES PATENT OFFICE

HARRY LE B. GRAY AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS OF MAKING CELLULOSE ACETATE

No Drawing. Application filed December 22, 1928. Serial No. 328,054.

This invention relates to processes for the manufacture of cellulose acetate in which the consumption of glacial acetic acid is reduced and a more readily recoverable solvent is substituted. The cellulose acetate produced by the hereinafter described process is in an especially porous solid form, having a relatively large ratio of surface to the mass which adapts it for subsequent fluid treatments.

Specifically, this invention is an improvement over that disclosed in the copending application of H. LeB. Gray, (one of the present applicants) Serial No. 240,943, filed November 17, 1927, now Patent No. 1,823,359 and the advantages there pointed out are attained to an even more marked degree. In the process there disclosed, the cellulosic material is treated in an acetylating mixture including ethylene dichloride and acetic acid insufficient by itself to dissolve the acetate formed.

We have discovered that if acetylation takes place with the acetic acid in insufficient quantity to dissolve the acetate, and the ethylene chloride added, after the acetylation has proceeded for some time, even greater advantages are obtained. The ethylene chloride is added after what might be called a preliminary acetylation of the cellulose in the fibrous form and in effect a non-solvent solution; a more thorough and uniform dispersion of the material throughout the bath is effected, a product results having surprisingly good qualities, especially for photographic purposes, such as film, being particularly free from haze, grain and fiber, with improved physical strength, flexibility and viscosity. The economy is very high, due to the substitution of ethylene chloride for acetic acid to the extent of approximately 40% of the total volume of the resultant dope. No heat is needed at any point in the process, except that necessary to bring the ethylene dichloride to the boiling point. The low temperature at which the reaction is carried out offers obvious and distinct advantages. The ethylene dichloride is easily recovered during precipitation and the material is produced in a fluffy form, simplifying its washing and use. The rather long acetylation period gives better opportunity for control of the process.

We shall now give an example of a method of carrying out our invention for purposes of illustration, but it will be understood that the invention will not be limited by the details therein given except as indicated in the appended claims. 50 parts by weight of cellulosic material, such as purified and bleached cotton linters, are immersed in 300 parts of glacial acetic acid containing 1.5 parts of 95% ortho phosphoric acid and ½ part of sulfuric acid at a temperature of 45 to 50° C., for four hours. The magma is then cooled and the liquid filtered off. The cellulose is pressed to 100–125 parts, total weight, having approximately an equal proportion of cellulose and liquid. This amount of acetic acid is insufficient to dissolve the cellulose acetate which is produced in the following operations, it being remembered that a flowable dope should be obtained.

Into the mixture of cellulosic material, residual catalyst and acetic acid, which has been cooled to a temperature of 50° F., 150 parts of 85% acetic anhydride is added. The mixture is then vigorously stirred for approximately thirty minutes. The external temperature during this initial acetylation stage is preferably mainatined between 50 and 56° F. At the end of this stage of acetylation a white, translucent, paste is obtained.

To the above mass is added 125 parts of ethylene dichloride at a temperature of 70 to 75° F., with constant stirring, which is continued for about five minutes to insure a homogeneous mixture, after which the product is allowed to stand at room temperature for eighteen to twenty-four hours. There results a highly viscous, light-colored cellulose acetate dope which is free from unacetylated fibers.

This reaction mixture containing the cellulose acetate which is produced, dissolved in dichlorethane and acetic acid, is then treated in a precipitating bath at a temperature at or above the boiling point of dichlorethane. We have found that a water bath close to its boiling point 100° C., is an excellent one into which to introduce and agitate the reaction mixture. As the streams of the reaction mixture enter the heated water, the dichlorethane is almost instantly vaporized and may be removed from above the liquid and condensed. Because of the vaporization of the dichlorethane the cellulose acetate is instantly precipitated in a remarkably porous or flocculent form, which presents very great surface relative to its mass, after being washed and dried. The dichlorethane may be separated from the water condensed with it, by decantation and is then ready for reuse. The acetic acid in the precipitating bath may be recovered in the usual way, but because of the small amount of it as compared to that which it is normally necessary to employ, notable economies can be obtained.

While in the above example a particular way of pretreating the cellulosic material prior to subjecting to the acetylating bath has been described, it will be understood that any of the known equivalent ways of pretreating the cellulose may be employed, or pretreatment may be eliminated entirely and an acetylation made with the major part of the normal quantities of acetic acid replaced with dichlorethane, or an equivalent stable organic liquid. It will also be understood that ethylene chloride, ethylene dichloride and dichlorethane, referred to herein, are all the same compound, are the saturated compound and are different from the unsaturated compound dichlorethylene.

Having thus described our invention, what we claim as new and desire to secure by Letters Patent is:

1. In the process of making cellulose acetate, treating cellulose with acetic anhydride, a catalyst and acetic acid, subsequently adding a volatile organic liquid thereto, said acetic acid, by itself, being insufficient to dissolve the cellulose acetate formed, said volatile organic liquid being substantially immiscible with water and inert toward the reagents present in the reaction bath, which cooperates with said acetic acid to complete the solution, the final reaction mixture containing dissolved cellulose acetate being treated in an aqueous precipitating bath at a temperature above the boiling point of said volatile liquid.

2. In a process of making cellulose acetate, treating cellulose with acetic anhydride and a catalyst and acetic acid, subsequently adding ethylene dichloride thereto, said acetic acid, by itself, being insufficient to dissolve the cellulose acetate formed, said ethylene dichloride cooperating with said acetic acid to complete the solution, the final reaction mixture containing dissolved cellulose acetate being precipitated by flowing into a hot aqueous bath at a temperature above 84° C., and recovering the evolved vapors.

3. In a process of making cellulose acetate which comprises the steps of treating a cellulose with acetic anhydride, a catalyst and acetic acid, adding ethylene dichloride to this reacting mixture, precipitating the resulting solution of cellulose acetate in an aqueous precipitating bath at a temperature of not less than 84° C., said acetic acid not, in itself, being sufficient to dissolve the cellulose acetate formed, said ethylene dichloride cooperating with the acetic acid to effect solution.

4. The process of producing cellulose acetate which comprises pre-acetylating cellulose with acetic anhydride, a catalyst and acetic acid, subsequently adding ethylene dichloride to the reaction mass and continuing the acetylation.

5. In the process of making cellulose acetate the step which comprises treating cellulose with acetic anhydride, a catalyst and acetic acid, said acetic acid by itself being insufficient to dissolve the cellulose acetate formed and subsequently adding a volatile organic liquid thereto, said volatile organic liquid being substantially immiscible with water and inert toward the reagents present in the reaction bath and cooperating with said acetic acid to complete the solution.

Signed at Rochester, New York, this 14th day of December, 1928.

HARRY LE B. GRAY.
CYRIL J. STAUD.